(12) United States Patent
Barbat et al.

(10) Patent No.: US 11,607,936 B1
(45) Date of Patent: Mar. 21, 2023

(54) MOVEABLE CROSSMEMBERS ADJACENT VEHICLE DOORS

(71) Applicant: Ford Global Technologies, LLC, Dearborn, MI (US)

(72) Inventors: Saeed D. Barbat, Novi, MI (US); Dean M. Jaradi, Macomb, MI (US); S. M. Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/522,210

(22) Filed: Nov. 9, 2021

(51) Int. Cl.
| B60J 5/04 | (2006.01) |
| E05D 15/06 | (2006.01) |
| B60R 19/42 | (2006.01) |

(52) U.S. Cl.
CPC .......... *B60J 5/0479* (2013.01); *B60J 5/0468* (2013.01); *B60R 19/42* (2013.01); *E05D 15/0652* (2013.01)

(58) Field of Classification Search
CPC ...... B60J 5/0443; B60J 5/0479; B60J 5/0468; B62D 21/157; B60R 19/42
USPC ............. 296/187.12, 147, 150, 146.1, 146.6; 293/128
See application file for complete search history.

(56) References Cited

U.S. PATENT DOCUMENTS

| | | | |
|---|---|---|---|
| 4,217,715 A | * | 8/1980 | Bryan, Jr. ............. G09F 21/048 293/118 |
| 4,437,697 A | | 3/1984 | Hinojos |
| 5,421,625 A | * | 6/1995 | Arko ....................... B60R 13/04 188/32 |
| 7,077,440 B1 | | 7/2006 | Morales et al. |
| 7,234,765 B1 | | 6/2007 | Mazzei et al. |
| 7,354,083 B1 | | 4/2008 | Obermann |
| 10,632,951 B2 | | 4/2020 | Nusier et al. |
| 10,906,488 B2 | | 2/2021 | Santiago |
| 2005/0110236 A1 | | 5/2005 | Stevenson |
| 2009/0278363 A1 | | 11/2009 | Browne et al. |
| 2015/0291116 A1 | | 10/2015 | Pi |
| 2019/0054957 A1 | | 2/2019 | Faruque et al. |

FOREIGN PATENT DOCUMENTS

| GB | 2579381 A | 6/2020 |
| GB | 2579383 A | 6/2020 |
| JP | 3765274 | 4/2006 |

OTHER PUBLICATIONS

Notice of Allowance for U.S. Appl. No. 17/411,381 as issued by the USPTO dated Sep. 2, 2022.

* cited by examiner

*Primary Examiner* — Joseph D. Pape
(74) *Attorney, Agent, or Firm* — Frank A. MacKenzie; Bejin Bieneman PLC (57) ABSTRACT

An assembly for a vehicle includes a front pillar and a rear pillar spaced along a vehicle-longitudinal axis. The front pillar and the rear pillar define a door opening. The assembly includes a first track supported by the front pillar and a second track supported by the rear pillar. The assembly includes a lower bar and an upper bar movable upwardly relative to the lower bar along the first track and the second track. The upper bar is movable between a lowered position and a raised position. The assembly includes a crossmember pivotally coupled to the lower bar and the upper bar.

19 Claims, 9 Drawing Sheets

MOVEABLE CROSSMEMBERS ADJACENT VEHICLE DOORS

BACKGROUND

A vehicle may include amenities that allow occupants ingress and egress of the vehicle. For example, a vehicle may not include a vertical, body-mounted pillar between the front pillar and rear pillar of a door opening to allow more space for occupants to ingress and egress the vehicle. Specifically, such vehicles may include two doors that meet at the location traditionally occupied by the vertical, body-mounted pillar when in a closed position. The door may be rotatable about the A-pillar and the C-pillar, respectively, such that the doors rotate away from each other to an open position.

DETAILED DESCRIPTION

An assembly includes a front pillar and a rear pillar spaced along a vehicle-longitudinal axis, the front pillar and the rear pillar defining a door opening. The assembly includes a first track supported by the front pillar and a second track supported by the rear pillar. The assembly includes a lower bar and an upper bar movable upwardly relative to the lower bar along the first track and the second track from a lowered position to a raised position. The assembly includes a crossmember pivotally coupled to the lower bar and the upper bar.

A second crossmember may be pivotally coupled to the lower bar and the upper bar, the second crossmember being elongated transverse to the crossmember when the upper bar is in the raised position.

The crossmember and the second crossmember may be pivotally engaged with each other.

The assembly may include a slot in the crossmember, a slot in the second crossmember, and a pin slideably engaged with the slot of the crossmember and the slot of the second crossmember.

At least one of the upper bar and the lower bar may include two slots, the crossmember being slideably engaged with one of the slots and the second crossmember being slideably engaged with the other of the slots.

At least one of the upper bar and the lower bar may include a channel and a glide, the glide being supported in the channel.

The glide may be connected to the crossmember.

The channel may include a second glide, the second glide being connected to the second crossmember.

The upper bar and the lower bar may be spaced from each other in the raised position.

The assembly may include a door between the front pillar and the rear pillar, the door having a closed position, the upper bar in the raised position when the door is in the closed position.

The door may be supported on the front pillar or the rear pillar.

The assembly may include a roof rail, the door being supported on the roof rail.

The assembly may include a rocker elongated from the front pillar to the rear pillar, the lower bar being supported by the rocker.

The lower bar and the upper bar may be vehicle-inboard of the rocker.

The upper bar and the lower bar may be vehicle-inboard of the door opening.

The assembly may include a computer including a processor and a memory storing instructions executable by the processor to identify a position of a door supported by a vehicle frame as being in a closed position; identify a vehicle mode of drive; and move the upper bar to a raised position based on at least the identification of the door being in the closed position or the identification of the vehicle mode being drive.

The instructions may include identifying a vehicle mode of park, identifying the vehicle mode has been switched to park and moving the upper bar from the raised position to the lowered position based on at least one of identification of the door being in the open position or identification of the vehicle mode being switched to park.

The assembly may include a linear actuator operatively connected to the upper bar to move the upper bar along the first track between the raised position and the lowered position.

The linear actuator may include a lead screw threadedly engaged with the upper bar and a motor operatively engaged with the lead screw to rotate the lead screw.

With reference to the Figures, wherein like numerals indicate like parts throughout the several views, an assembly 10 for a vehicle 12 includes a front pillar 14 and a rear pillar 16 spaced along a vehicle-longitudinal axis L. The front pillar 14 and the rear pillar 16 define a door opening 18. The assembly 10 includes a first track 20 supported by the front pillar 14 and a second track 22 supported by the rear pillar 16. The assembly 10 includes a lower bar 24 and an upper bar 26 movable upwardly relative to the lower bar 24 along the first track 20 and the second track 22. The upper bar 26 is movable between a lowered position and a raised position. The assembly 10 includes a crossmember pivotally coupled to the lower bar 24 and the upper bar 26.

The upper bar 26 may be moved into the raised position when the vehicle 12 is in motion and the lowered position for occupant ingress and egress. Because the crossmember 28 is pivotally coupled to the lower bar 24 and the upper bar 26, when the upper bar 26 is in the raised position the crossmember 28 extends across the door opening 18 in the raised position. In some examples, including the example shown in the figures, a vehicle body 30 of the vehicle 12 does not include a middle pillar, i.e., is B-pillarless. In such an example, the upper bar 26 and the crossmember 28 may provide reinforcement to the vehicle body 30 at the door opening 18. The upper bar 26 may be moved to the lowered position for occupant ingress and egress through the door opening 18 and, because the crossmember 28 is pivotally connected to the upper bar 26 and the lower bar 24, the crossmember 28 moves to the lowered position when the upper bar 26 is moved to the lowered position.

Figure 1:
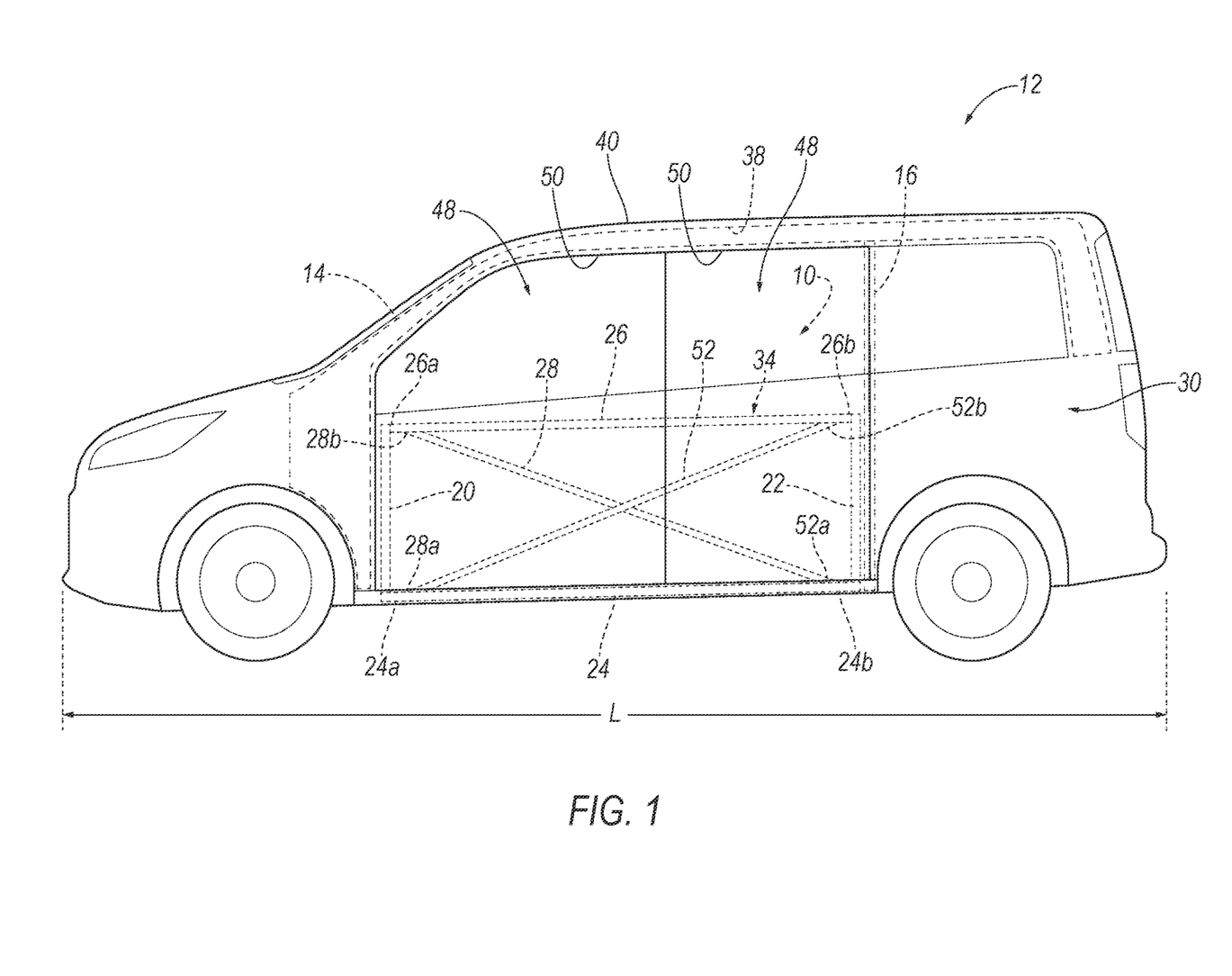
FIG. 1 is a side view of a vehicle having an assembly adjacent vehicle doors with the assembly in the raised position.
Figure 2:
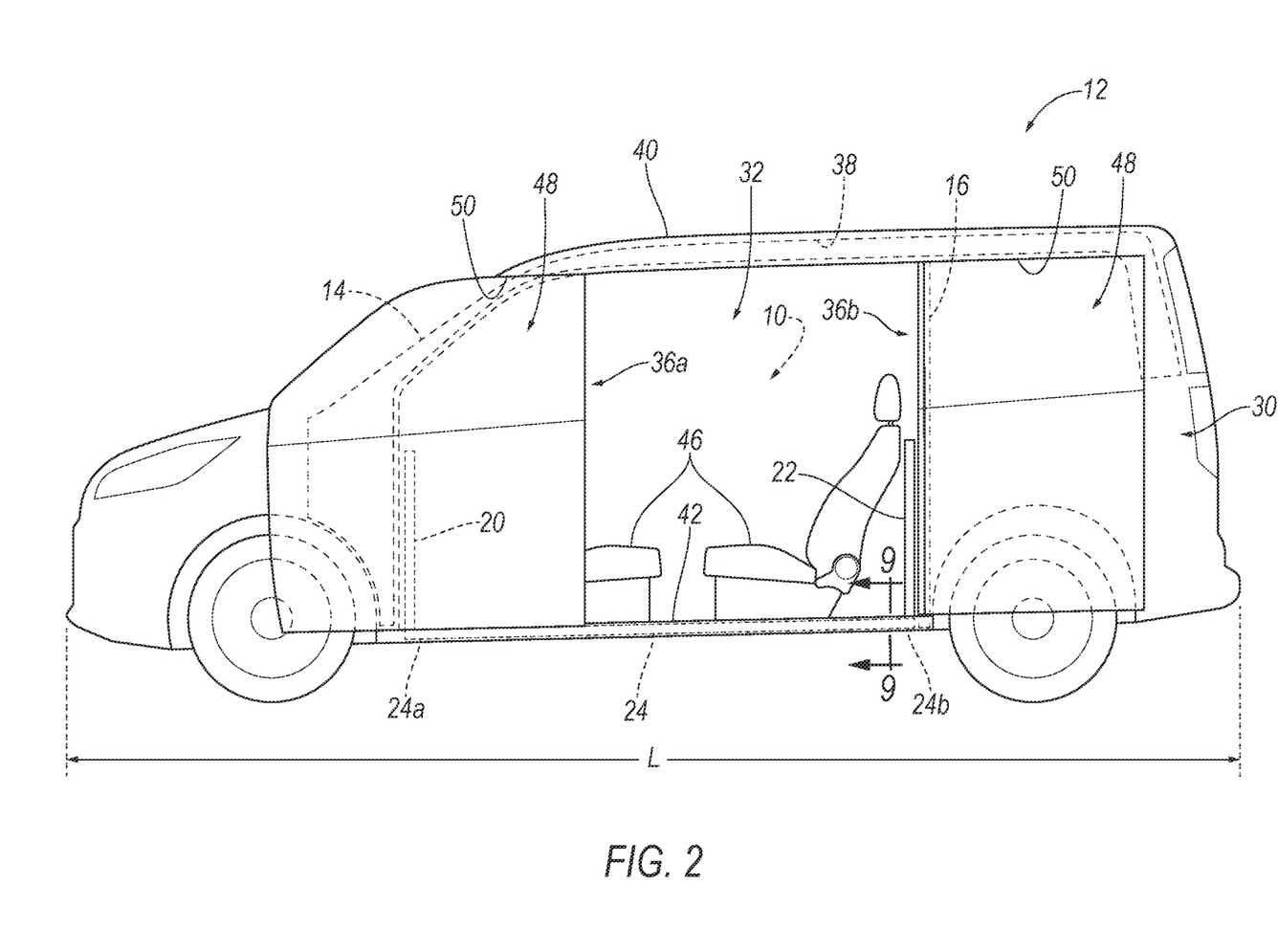
FIG. 2 is a side view of the vehicle having the assembly adjacent vehicle doors with the assembly in the lowered position.
Figure 3:
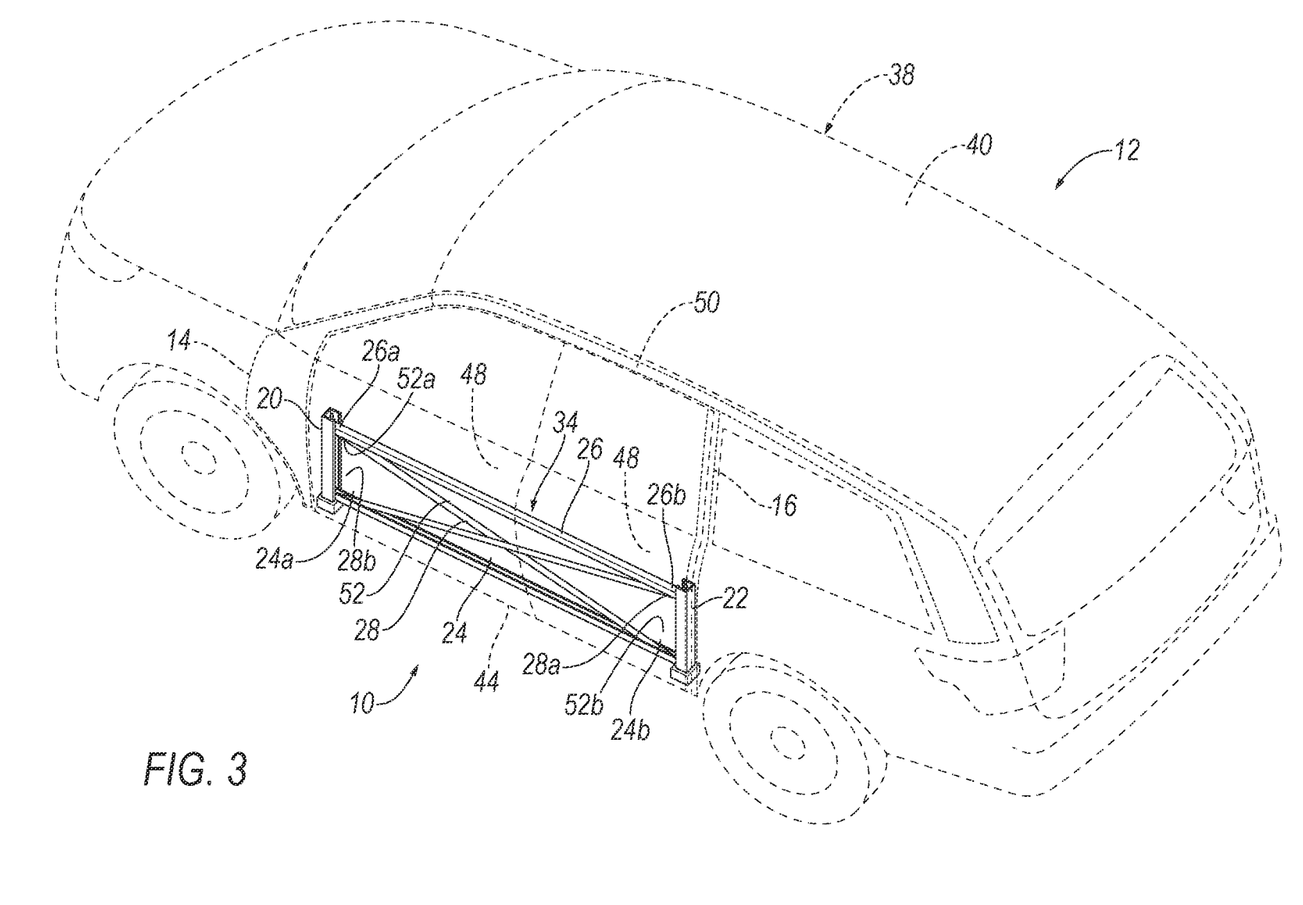
FIG. 3 is a perspective view of the vehicle an assembly adjacent vehicle doors with the assembly in the raised position.

With reference to FIGS. 1-3, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a vehicle frame (not numbered) and a vehicle body 30. The vehicle frame and the vehicle body 30 may be of a unibody construction in which the frame is unitary with a vehicle body 30 (including frame rails, pillars, roof rails, etc.). As another example, the vehicle body 30 and vehicle frame may have a body-on-frame construction (also referred to as a cab-on-frame construction) in which the vehicle body 30 and frame are separate components, i.e., are modular, and the vehicle body 30 is supported on and affixed to the frame. Alternatively, the vehicle frame and vehicle body 30 may have any suitable construction. The vehicle frame and vehicle body 30 may be of any suitable material, for example, steel, aluminum, and/or fiber-reinforced plastic, etc.

The vehicle body 30 may define a passenger compartment 32 to house occupants, if any, of the vehicle 12. The passenger compartment 32 may extend across the vehicle 12, i.e., from one side to the other side of the vehicle 12. The passenger compartment 32 includes a front end 36a and a rear end 36b with the front end 36a being in front of the rear end 36b during forward movement of the vehicle 12.

With continued reference to FIGS. 1-3, the vehicle body 30 includes two roof rails 38. The roof rails 38 are spaced from one another in a cross-vehicle direction. The roof rails 38 each extend longitudinally along the vehicle body 30, i.e., along a vehicle-longitudinal axis L.

The vehicle body 30 includes a vehicle roof 40. The vehicle roof 40 may define the upper boundary of the passenger compartment 32 and may extend from the front end 36a of the passenger compartment 32 to the rear end 36b of the passenger compartment 32. The vehicle roof 40 may extend from one roof rail 38 to the other roof rail 38. The vehicle roof 40 may be irremovably fixed to the roof rails 38. In other words, the vehicle roof 40 is secured to the roof rails in such a way that removal requires destruction such as cutting, e.g., cutting material and/or welded joints, etc. As an example, the vehicle roof 40 may be attached to both roof rails 38, e.g., by welding, fasteners, etc.

With reference to FIG. 2, the vehicle body 30 includes a vehicle floor 42 spaced downwardly from the vehicle roof 40. The vehicle floor 42 may define the lower boundary of the passenger compartment 32 and may extend from the front end 36a of the passenger compartment 32 to the rear end 36b of the passenger compartment 32. The vehicle floor 42 may include a floor panel and upholstery on the vehicle floor 42. The upholstery may be, for example, carpet, and may have a class-A surface facing the passenger compartment 32, i.e., a surface specifically manufactured to have a high quality, finished, aesthetic appearance free of blemishes. The vehicle floor 42 may include cross-beams (not shown) connected to the floor panel and to other components of the vehicle body 30.

The vehicle body 30 may include pillars 14, 16, spaced from each along the vehicle-longitudinal axis L on both sides of the vehicle body 30. Specifically, the vehicle body 30 includes the front pillar 14, e.g., an A-pillar, and the rear pillar 16 (which may be referred to as a C-pillar even in examples where there is no B-pillar) spaced vehicle-rearward from the front pillar 14 on each side of the vehicle body 30. For example, the vehicle body 30 includes a front pillar 14 and a rear pillar 16 on each side of the vehicle 12 with the front pillar 14 being spaced from the rear pillar 16. In other words, the front pillar 14 may be disposed at the front end 36a of the passenger compartment 32. The pillars 14, 16 may extend from the vehicle roof 40 to the vehicle floor 42. The vehicle 12 may include other pillars, in addition to the front pillar 14 and the rear pillar 16. For example, as shown in the Figures, the vehicle 12 may include a D-pillar (not numbered) disposed at the rear end 36b of the passenger compartment 32 on each side of the vehicle 12.

With continued reference to FIGS. 1-3, the vehicle body 30 includes rockers 44 extending from the front pillar 14 to the rear pillar 16. Specifically, the vehicle body 30 may include two rockers 44, one on each side of the vehicle body 30. The rockers 44 are elongated along the vehicle-longitudinal axis L. Specifically, the rockers 44 are elongated from the front pillar 14 to the rear pillar 16. The vehicle 12 may include two rockers 44, i.e., one rocker 44 on either side of the passenger compartment 32. The rockers 44 are spaced from the roof rails 38 below the roof rails 38. The rockers 44 are below the passenger compartment 32. In some examples, the rockers 44 may be connected to the pillars 14, 16, in any suitable way, e.g., welding, adhesive, fasteners, etc. In other words, in such examples, the rockers 44 and the pillars 14, 16, are separate from each other and connected to each other. In other examples, the rockers 44 may be unitary with the pillars 14, 16, i.e., a single, uniform piece of material with no seams, joints, fasteners, or adhesives holding it together. In such an example, the pillars 14, 16, and the rocker 44 may be formed together simultaneously as a single continuous unit, e.g., by molding, forging, casting, stamping, etc. The vehicle floor 42 may be supported by the rockers 44.

The vehicle body 30 includes a sill (not numbered). The sill defines the lower-most boundary of the door opening 18. The sill may be an uppermost surface of the rocker 44. As another example, the sill may be a separate component than the rest of the rocker 44 and disposed above the rest of the rocker 44.

The vehicle body 30 may define the door opening 18. Specifically, the vehicle body 30 may include one or more door openings 18 between pillars 14, 16, of the vehicle body 30. The door opening 18 may be between the front pillar 14 and the rear pillar 16 and between the rocker 44 and the roof rail 38. In other words, the pillars 14, 16, are spaced from each other by the door opening 18 and the roof rail 38 and rocker 44 are spaced from each other by the door opening 18. The door opening 18 extends uninterrupted from the front pillar 14 to the rear pillar 16. The door opening 18 extends uninterrupted from the rocker 44 to the roof rails 38. The door opening 18 allows for ingress and egress into the passenger compartment 32. The vehicle 12 may include any suitable number of door openings 18 to allow for ingress and egress into the passenger compartment 32. For example, as shown in the Figures, the vehicle 12 may include a door opening 18 on each side of the vehicle 12. In other examples, the vehicle 12 may include multiple door openings 18 on each side of the vehicle 12.

With reference to FIG. 2, the vehicle body 30 may not include a middle pillar between the front pillar 14 and the rear pillar 16, i.e., the vehicle body 30 may not include a middle pillar, e.g., a B-pillar, between the front pillar 14 and the rear pillar 16 from the vehicle floor 42 to the vehicle roof 40. In other words, the vehicle body 30 is B-pillarless. The vehicle body 30 lacking a middle pillar allows for the door opening 18 to extend from the front pillar 14 to the rear pillar 16. The door opening 18 extending from the front pillar 14 to the rear pillar 16 allows occupants easier access to the passenger compartment 32 for ingress and egress.

The vehicle 12 may include one or more seats 46. Specifically, the vehicle 12 may include any suitable number of seats 46. The seats 46 are supported by the vehicle floor 42. The seats 46 may be arranged in any suitable arrangement in the passenger compartment 32. As in the example shown in the Figures, one or more of the seats 46 may be at the front end 36a of the passenger compartment 32, e.g., a driver seat and/or a passenger seat. In other examples, one or more of the seats 46 may be behind the front end 36a of the passenger compartment 32, e.g., at the rear end 36b of the passenger compartment 32. The seats 46 may be movable relative to the vehicle floor 42 to various positions, e.g., movable fore-and-aft and/or cross-vehicle. The seat 46 may be of any suitable type, e.g., a bucket seat. The seats 46 may be adjacent the door openings 18 in the vehicle body 30.

With continued reference to FIGS. 1-3, the vehicle 12 includes at least one door 48 between the front pillar 14 and the rear pillar 16, e.g., a front door 48 and a rear door 48 on each side of the vehicle body 30, movable from a closed position to an open position for vehicle occupants to enter and exit a passenger compartment 32. The door may be supported by the front pillar 14, the rear pillar 16, or the roof rail 38 in the door opening 18. As shown in the Figures, the front door 48 may be supported by the front pillar 14 and the rear door 48 may be supported by the rear pillar 16. As another example, the door 48 may be supported on the roof rail 38 and open upwardly. In the closed position, the door 48 is in at least one of the door openings 18 in the vehicle body 30. In the example shown in FIGS. 1 and 3, the front door 48 and the rear door 48 are both in the single door opening 18 in the vehicle body 30. In the open position, at least one of the door openings 18 in the vehicle body 30 may be exposed. Each of the doors 48 are adjacent a seat 46 in the vehicle 12. Each of the front seats 46 and each of the rear seats 46 may be adjacent a door 48 of the vehicle 12. Specifically, each front seat 46 may be adjacent a front door 48 and each rear seat 46 may be adjacent a rear door 48. The doors 48 are vehicle-outboard from each of the front seats 46 and each of the rear seats 46.

As shown in the example in FIG. 2, the doors 48 may be slidably supported by the vehicle body 30. For example, the vehicle body 30 may include a track (not numbered) with the doors 48 being slidably supported by the track. Each of the doors 48 is movable, i.e., slidable, from the closed position to the open position. In the closed position, the doors 48 on each side of the vehicle 12, i.e., the front door 48 and the rear door 48, are adjacent each other. As the doors 48 move to the open position, the front door 48 moves away from the rear door 48 toward the front end 36a of the passenger compartment 32 and the rear door 48 moves away from the front door 48 toward the rear end 36b of the passenger compartment 32. As described above, in an example in which the door 48 is supported on the roof rail 38, the door 48 may open upwardly. In this example, the door 48 may be pivotally supported by the vehicle body 30. As the door 48 moves to the open position, the door 48 moves away from the rocker 44 and the passenger compartment 32. The door 48 may be supported by the vehicle body 30 with a hinge.

The numerical adverbs "first" and "second" with respect to the doors 48 are used herein merely as identifiers and do not signify order or importance. The terms "first" and "second" may be used interchangeably when referring to the doors 48 as shown in the Figures.

The roof rails 38 contact a top edge 50 of the doors 48 when the doors 48 are in the closed position. Each door 48 includes at least one door panel (not numbered) and a door-trim panel (not shown) supported on the door panel. Specifically, the door 48 may include two panels, namely a door inner (not shown) and a door outer (not numbered). In such an example, the door-trim panel and the door outer are fixed to the door inner. The door-trim panel is positioned opposite the door outer relative to a door frame. The door-trim panel is inboard relative to the door inner, and the door outer is outboard relative to the door inner. The door 48 includes a window door opening (not numbered) that may be completely closed by a window (not numbered) when the window is in a fully raised position. The window door opening is defined by the door-trim panel and door outer on a bottom edge and either by the door inner circumscribing the window door opening or by the vehicle body 30, e.g., the A pillar, the B pillar, and the roof rail 38. The door outer faces outboard relative to the vehicle 12.

The door outer may define a portion of the exterior of the vehicle 12. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door 48.

With reference to FIGS. 1-4, the assembly 10 includes the upper bar 26 movable relative to the pillars 14, 16, from the lowered position to the raised position. The upper bar 26 and the lower bar 24 are spaced from each other in the raised position. In the example shown in FIGS. 1 and 3, the upper bar 26 extends completely across the door opening 18 in the raised position.

The lower bar 24 and the upper bar 26 may extend from the front pillar 14 to the rear pillar 16 in the raised position and the lowered position. Specifically, the lower bar 24 and the upper bar 26 each may extend from a first end 24a, 26a supported by the front pillar 14 to a second end 24b, 26b supported by the rear pillar 16. The lower bar 24 and the upper bar 26 each extend from one side of the door opening 18 to the other side of the door opening 18. In other words, the lower bar 24 and the upper bar 26 are elongated completely across the door opening 18 in the raised position. Specifically, the lower bar 24 and the upper bar 26 extend continuously, i.e., unbroken, across the door opening 18, e.g., from the front pillar 14 to the rear pillar 16 in both the lowered position and the raised position. The lower bar 24 and the upper bar 26 are vehicle-inboard of the door opening 18.

The lower bar 24 may be elongated along the rocker 44 when the upper bar 26 is in the raised position. Specifically, the lower bar 24 may be supported by the rocker 44. The lower bar 24 and the upper bar 26 may be elongated along the rocker 44 when the lower bar 24 and the upper bar 26 are in the lowered position. Specifically, the lower bar 24 and the upper bar 26 are elongated from the front pillar 14 to the rear pillar 16 along the rocker 44 when the bars 24, 26 are in the lowered position. The lower bar 24 and the upper bar 26 may be vehicle-inboard of the rocker 44. Specifically, the lower bar 24 and the upper bar 26 may be on the vehicle-inboard side of the rocker 44 both in the lowered position and the raised position.

The lower bar 24 and the upper bar 26 are elongated adjacent the doors 48 of the vehicle 12. The upper bar 26 is in the raised position when the doors 48 are in the closed position, e.g., when the vehicle 12 is in motion, and the upper bar 26 is in the lowered position when the doors 48 are in the open position, e.g., when the vehicle 12 is no longer in motion. When the doors 48 are in the closed position and the upper bar 26 is in the raised position, the lower bar 24 and the upper bar 26 are adjacent the doors 48. Specifically, when the doors 48 are in the closed position and the upper bar 26 is in the raised position, the lower bar 24 and the upper bar 26 are vehicle-inboard of the doors 48. In other words, the lower bar 24 and the upper bar 26 are vehicle-inboard of the door opening 18. When the doors 48 are in the open position, the lower bar 24 and the upper bar 26 are below the doors 48 and in the lowered position.

With reference to FIGS. 1 and 3, the assembly 10 includes the crossmember 28. The assembly 10 may include a second crossmember 52 pivotally connected to the lower bar 24 and the upper bar 26. Specifically, the assembly 10 may include a scissor mechanism 34 including the crossmember 28, second crossmember 52, lower bar 24, and upper bar 26. The scissor mechanism 34 is folded flat in an undeployed position and has an X-shaped configuration in a deployed position, i.e., the crossmember 28 and the second crossmember 52 have an X-shaped configuration in the deployed position. As an example, shown in FIGS. 1 and 3, the assembly 10 includes the crossmember 28 and the second crossmember 52. Specifically, each crossmember 28, 52 has a first end 28a, 52a and a second end 28b, 52b. The crossmember 28 and the second crossmember 52 are elongated from their first ends 28a, 52a to their second ends 28b, 52b. When the upper bar 26 is in the raised position, the second crossmember 52 is elongated transverse to the crossmember 28.

Figure 9:
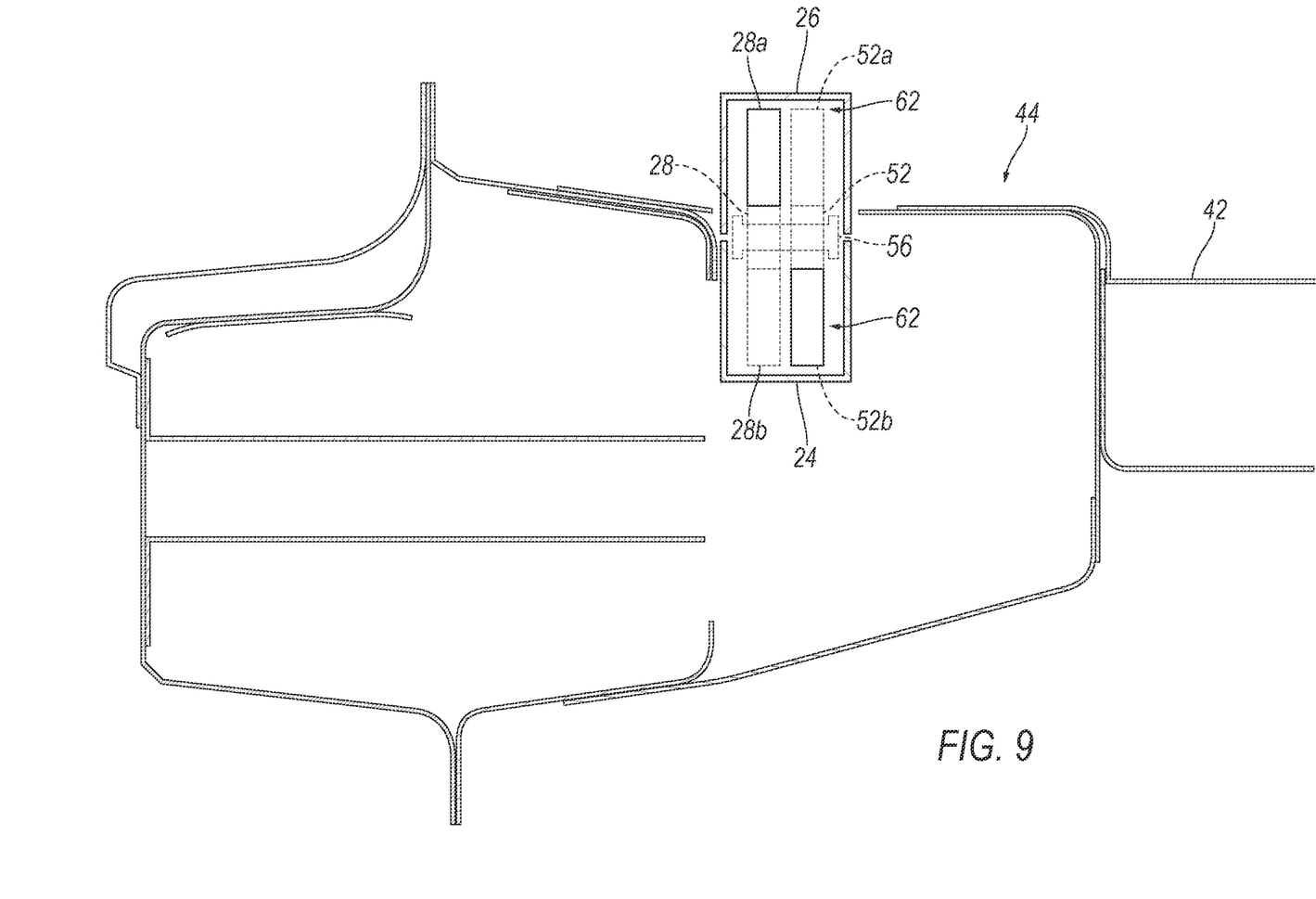
FIG. 9 is a cross-sectional view of FIG. 2 at 9-9.

As shown in FIG. 9, when the lower bar 24 and the upper bar 26 are in the lowered position, the crossmember 28 and the second crossmember 52 may be adjacent each other. Specifically, the first end 28a of the crossmember 28 may be adjacent the second end 52b of the second crossmember 52, and the second end 28b of the crossmember 28 may be adjacent the first end 52a of the second crossmember 52. The crossmember 28 and the second crossmember 52 are pivotally engaged with each other. When the upper bar 26 is in the raised position, the crossmember 28 and the second crossmember 52 are in an "X-Shape."

The crossmember 28 and the second crossmember 52 are each pivotally coupled to the lower bar 24 and the upper bar 26. As the upper bar 26 is moved up or down relative to the lower bar 24, the crossmember 28 and the second crossmember 52 pivot relative to the lower bar 24 and the upper bar 26. As shown in the Figures, the first end 28a of the crossmember 28 is pivotally coupled to the first end 24a of the lower bar and the second end 28b of the crossmember 28 is pivotally coupled to the second end 26b of the upper bar 26. The first end 52a of the second crossmember 52 is pivotally coupled to the second end 24b of the lower bar 24 and the second end 52b of the second crossmember 52 is pivotally coupled to the first end 26a of the upper bar 26.

Figure 5A:
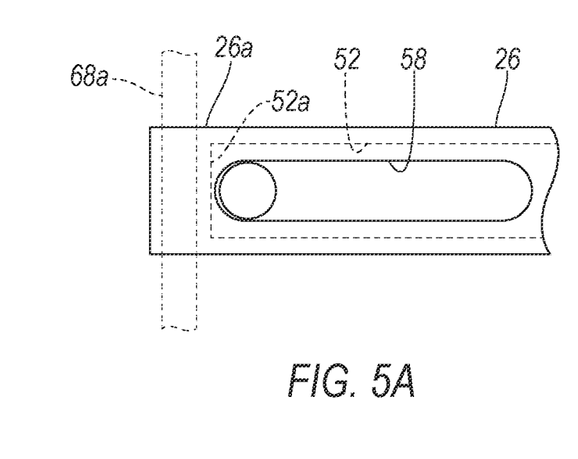
FIG. 5A is a side view of an upper bar having a slot in the lowered position.
Figure 5B:
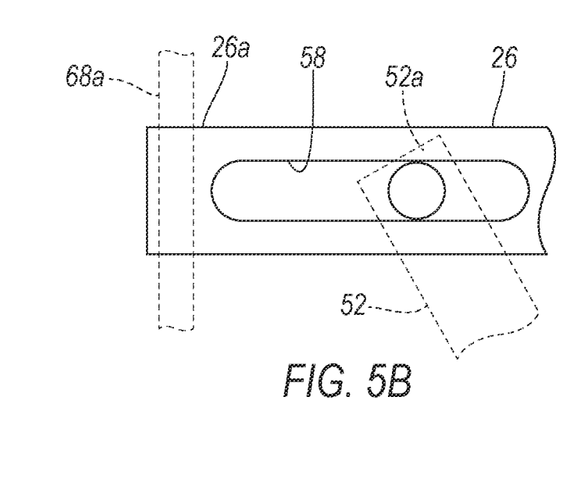
FIG. 5B is a side view of the upper bar having the slot in the raised position.
Figure 6A:
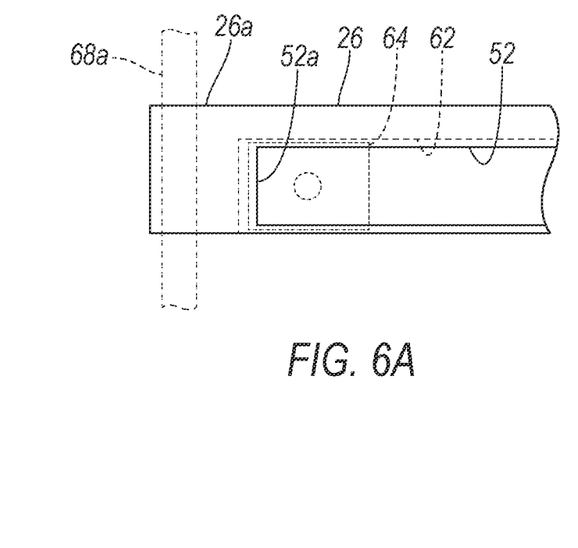
FIG. 6A is a side view of the upper bar having a channel in the lowered position.
Figure 6B:
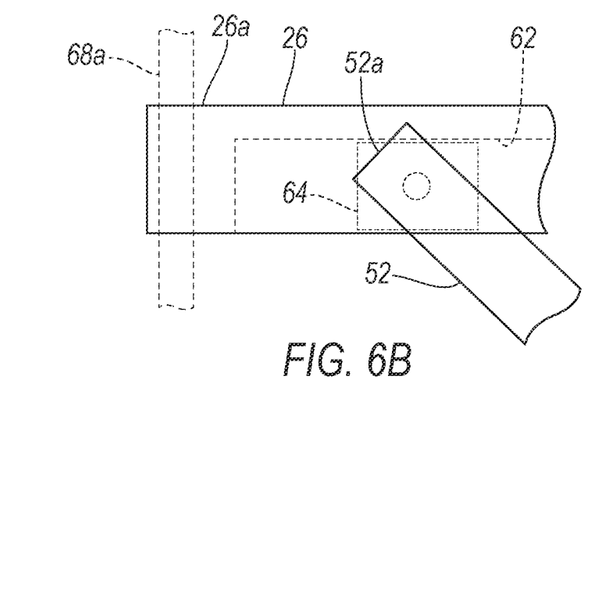
FIG. 6B is a side view of the upper bar having the channel in the raised position.
Figure 7A:
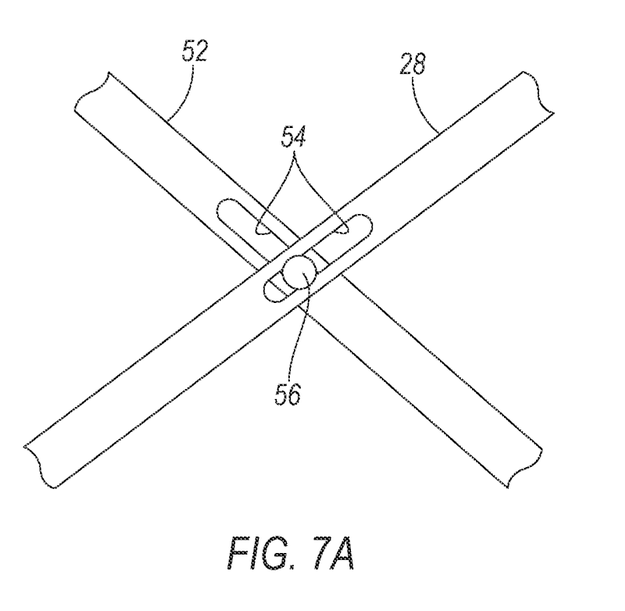
FIG. 7A is a side view of the assembly having a free-floating pin in the raised position.
Figure 7B:
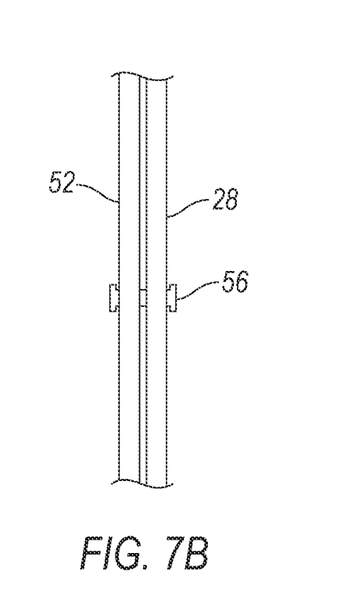
FIG. 7B is a front view of FIG. 7A.
Figure 8A:
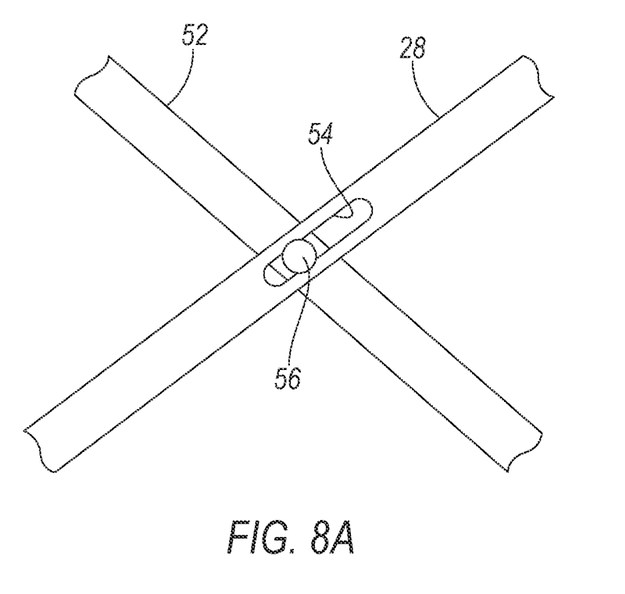
FIG. 8A is a side view of the assembly having a fixed pin in the raised position.
Figure 8B:
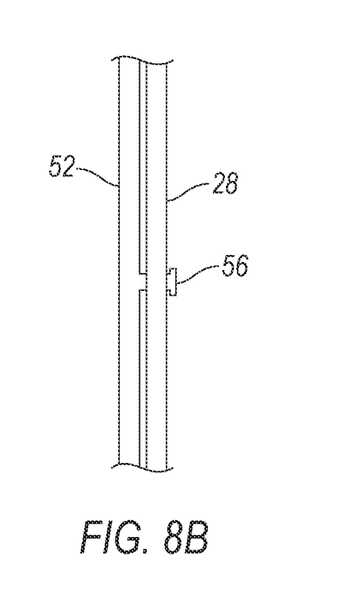
FIG. 8B is a front view of FIG. 8A.

The crossmember 28 and the second crossmember 52 may be slideable along the vehicle-longitudinal axis L relative to the upper bar 26 and/or the lower bar 24 while the upper bar 26 moves relative to the lower bar 24. One example of a slideable connection between the crossmember 28 and second crossmember 52 and the upper bar 26 is shown in FIGS. 5A-B and another example of the slideable connection between the crossmember 28 and second crossmember 52 and the upper bar 26 is shown in FIGS. 6A-B. Specifically, as one example, shown in FIGS. 5A-B, the upper bar 26 and/or the lower bar 24 may each include a slot 58 and a second slot 60. As described below, the crossmember 28 and the second crossmember 52 may be slidably engaged with the slot 58 and the second slot 60. As another example, shown in FIGS. 6A-B, the assembly 10 incudes glides 64 between the upper bar 26 and/or the lower bar 24 and the crossmember 28 and/or second crossmember 52. The glides 64 slide along the upper bar 26 and/or lower bar 24 as the upper bar 26 moves between the raised and lowered positions. Slideable connections between the lower bar 24 and the crossmember 28 and second crossmember 52 may be the same as or different than the slideable connections between the upper bar 26 and the crossmember 28 and second crossmember 52.

With reference to the example shown in FIGS. 5A-B, the upper bar 26 and/or the lower bar 24 may each include the slot 58 and the second slot 60. In the example shown in FIGS. 5A-B, the upper bar 26 includes the slot 58 and the second slot 60. The slot 58 is disposed at the first end 26a of the upper bar 26 and the second slot 60 is disposed at the second end 26b of the upper bar 26. The crossmember 28 is engaged with the slot 58 and the second crossmember 52 is engaged with the second slot 60. Specifically, the crossmember 28 is slidably engaged with the slot 58 and the second crossmember 52 is slidably engaged with the second slot 60. When the upper bar 26 moves from the lowered position to the raised position, the second end 28b of the crossmember 28 and the second end 52b of the second crossmember 52 slide toward each other in the slots 58, 60. The slots 58, 60 may be any suitable size and shape to allow the upper bar 26 to move to the raised position.

With reference to the example shown in FIGS. 6A-B, the glides 64 are slideably engaged with the upper bar 26 and/or lower bar 24 to slide along the channel 62 as the upper bar 26 is raised and lowered. For example, the upper bar 26 and the lower bar 24 may each include a channel 62 and, in such an example, the glide 64 is slideably engaged in the channel 62. Specifically, the glide 64 is retained in the channel 62 along the channel 62 and is slideable along the channel 62 as the upper bar 26 is raised and lowered. The channel 62 may extend from the first ends 24a, 26a to the second ends 24b, 26b of the upper bar 26 and/or the lower bar 24. The upper bar 26/lower bar 24 may be pivotally connected to the glide 64, e.g., with pins. When the upper bar 26 moves between the lowered position and the raised position, the glides 64 slide within the channel 62. Specifically, the glide 64 and the second glide 64 slide toward each other within the channel 62 when the upper bar 26 is moved from the lowered position to the raised position and move away from each other within the channel 62 when the upper bar 26 is moved from the raised position to the lowered position. As an example, the upper bar 26 and the lower bar 24 may each have channels 62 and the crossmember 28 and second crossmember 52 both may be connected to glides 64 in both the upper bar 26 and the lower bar 24. As another example, the crossmember 28 and the second crossmember 52 (in examples including the second crossmember 52) may be pivotally connected and slideably fixed to one of the upper bar 26 and the lower bar 24 and may be slideably engaged with the other of the upper bar 26 and the lower bar 24 with the glides 64.

The crossmember 28 and the second crossmember 52 may be connected to each other. As an example, the crossmember 28 and the second crossmember 52 may be pinned to each other between the upper bar 26 and the lower bar 24. For example, the crossmember 28 and the second crossmember 52 may each include a slot 54 and a pin 56 may be slideably engaged with the crossmember 28 and the second crossmember 52 in the slot 54. When the crossmember 28 and the second crossmember 52 move between the lowered position and the raised position, the pin 56 slides along the slots 54. As an example, when the crossmember 28 and the second crossmember 52 are in an "X-Shape," the pin 56 is at the intersection of the crossmember 28 and the second crossmember 52.

As shown in FIGS. 7A-8B, the pin 56 may be free-floating or may be fixed to one of the crossmember 28 or the second crossmember 52 and slideable relative to the other of the crossmember 28 or second crossmember 52. In the example shown in FIGS. 7A-B, the pin 56 is free-floating. In other words, the pin 56 is engaged with the crossmember 28 and the second crossmember 52 and is slideable relative to both the crossmember 28 and the second crossmember 52 along the slot 54. As another example shown in FIG. 8A-B, the pin 56 is fixed to one of the crossmember 28 or the second crossmember 52 and slideable relative to the other of the crossmember 28 or second crossmember 52.

With reference to FIGS. 1-3, the assembly 10 includes the first track 20 supported by the front pillar 14 and the second track 22 supported by the rear pillar 16. Specifically, the first track 20 is supported by the front pillar 14 and the second track 22 is supported by the rear pillar 16. The tracks 20, 22, may extend upwardly from the vehicle floor 42 toward the vehicle roof 40. Specifically, the tracks 20, 22 each extend generally vertically and parallel along the front pillar 14 and the rear pillar 16. Generally vertical and generally parallel means that the tracks 20, 22 may deviate from vertical or parallel due to manufacturing or architecture of the vehicle body 30 to the extent that the upper bar 26, the crossmember 28, or the second crossmember 52 can move from the lowered position to the raised position as described above. In the example shown in FIG. 4, the tracks 20, 22, may include a "C" shaped cross-section, but the tracks 20, 22, may be of any suitable cross-section.

The tracks 20, 22 may be exposed to the passenger compartment 32. The upper bar 26, the lower bar 24, the crossmember 28, and the second crossmember 52 may be exposed to the passenger compartment 32. In other words, the assembly 10 may not include trim panels that cover the tracks 20, 22, the upper bar 26, the lower bar 24, the crossmember 28, or the second crossmember 52 in the vehicle 12. The assembly 10 may include rubber covers (not shown) over the assembly 10, to conceal any mechanism of the assembly 10.

The assembly 10 may include any suitable number of tracks 20, 22, supported by the pillars 14, 16. As shown in the example in the Figures, a single track 20 may be supported by the front pillar 14 and a single track 22 may be supported by the rear pillar 16. In such an example, the upper bar 26 is movable relative to the tracks 20, 22, supported by the pillars. In other examples, multiple tracks 20, 22, may be supported by the front pillar 14 and multiple tracks 20, 22, may be supported by the rear pillar 16. In such examples, the upper bar 26 and the lower bar 24 may be supported by one track 20, 22 supported by the pillars, i.e., the number of tracks 20, 22, supported by each pillar 14, 16 may be equal to the number of bars movable relative to the pillars 14, 16.

As previously discussed above, the upper bar 26 is movable relative to the front pillar 14 and the rear pillar 16. The upper bar 26 is movably engaged with the front pillar 14 at the first end 26a and the rear pillar 16 at the second end 26b. Specifically, the first end 26a of the upper bar 26 is movably engaged with the first track 20 at the front pillar 14 and the second end 26b of the upper bar 26 is movably engaged with the second track 22 at the rear pillar 16. The ends 26a, 26b of the upper bar 26 move along each of the pillars 14, 16, e.g., along the tracks 20, 22, as the upper bar 26 moves from the lowered position to the raised position.

Figure 4:
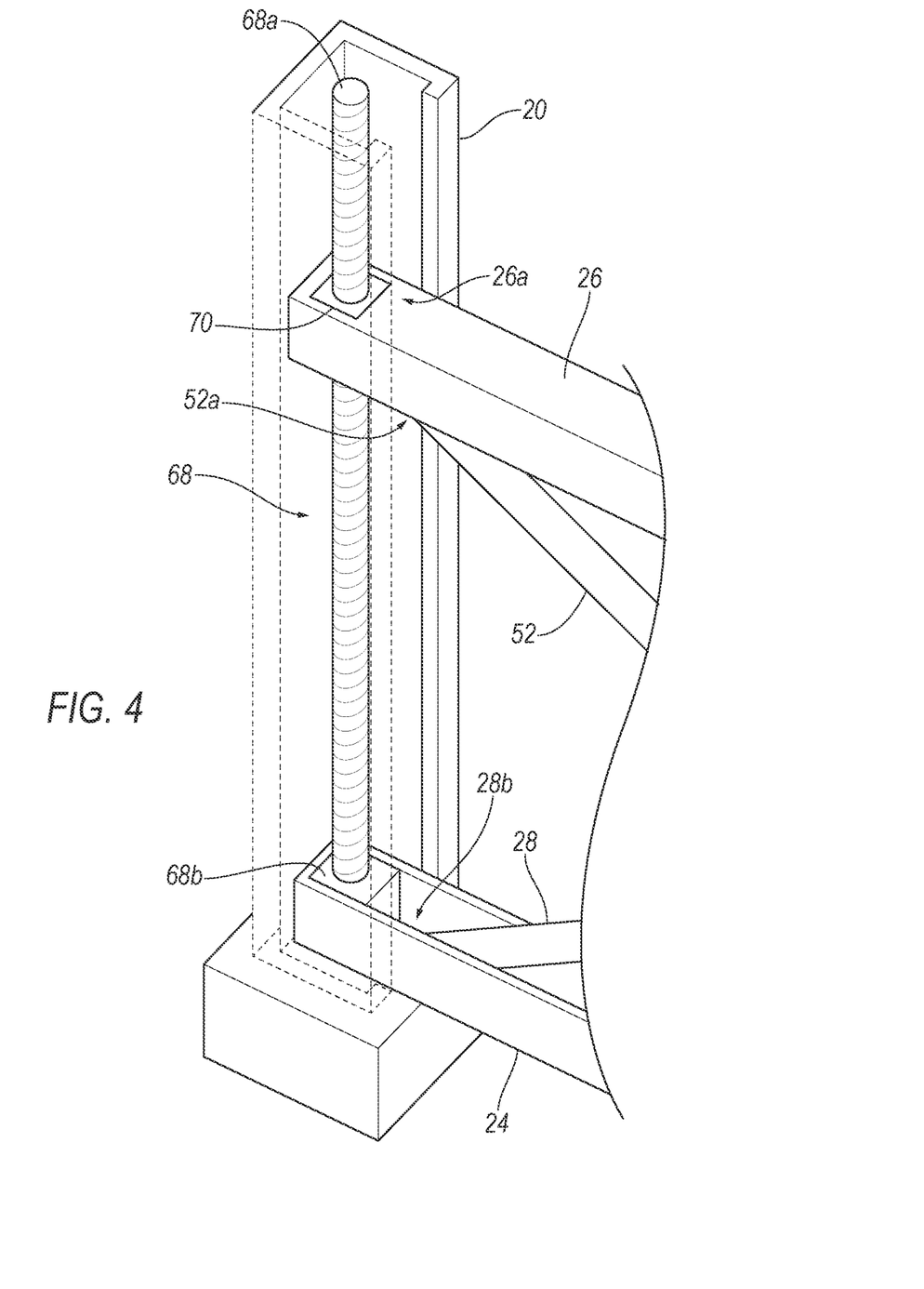
FIG. 4 is a perspective view of the assembly having a linear actuator in between the raised position and the lowered position.

With reference to FIG. 4, the assembly 10 may include one or more linear actuator 68 operatively connected to the upper bar 26 to move the upper bar 26 along one or more of the tracks 20,22 between the raised position and the lowered position. Specifically, the linear actuator 68 may be fixed to one or more of the tracks 20, 22 and drivably coupled to the upper bar 26 to move the upper bar 26 along the tracks 20, 22 between the raised position and the lowered position. Specifically, as shown in the example in the Figures, the assembly 10 may include a linear actuator 68 coupled to the upper bar 26 at the first end 26a to move the upper bar 26 along the first track 20 and a second linear actuator 68 coupled to the upper bar 26 at the second end 26b to move the upper bar 26 along the second track 22. Each of the linear actuators 68 may move simultaneously such that the first end 26a and the second end 26b each move simultaneously. In other words, the linear actuators 68 at each of the first end 26a and the second end 26b move the first end 26a and the second end 26b at the same rates.

As shown in the example in the Figures, the linear actuator 68 may include a lead screw 68a extending along the tracks 20, 22, i.e., from a bottom of the tracks 20, 22 to a top of the tracks 20, 22. The upper bar 26 may include a carriage 70 at each of the ends 26a, 26b of the upper bar 26 that allows the upper bar 26 to move along the lead screw 68a to a predetermined height. Specifically, the carriage 70 is threaded to match threads on the lead screw 68a such that rotation of the lead screw 68a linearly moves the carriage 70, and thus the upper bar 26, relative to the lead screw 68a. The linear actuator 68 may include an electric motor 68b. The electric motor 68b may fixed relative to the lower bar 24, e.g., may be fixed to the lower bar 24. The electric motor 68b rotates the lead screw 68a to move the upper bar 26 between the lowered position and the raised position. The carriage 70 carries the upper bar 26 along threads of the lead screw 68a to move the upper bar 26 along the tracks 20, 22. The threads of the lead screw 68a may be tuned to adjust the rate at which the upper bar 26 may move along the tracks 20, 22. The linear actuator 68 may be in communication with a sensor (not shown) identifying the location of the upper bar 26 along the tracks 20, 22. In other examples, the linear actuator 68 may include any suitable mechanism to move the upper bar 26 from the lowered position to the raised position, e.g., a rack and pinion.

With reference to FIG. 9, a cross-sectional view through line 9-9 of FIG. 2, the rocker 44 may define a channel (not numbered) elongated from the front pillar 14 to the rear pillar 16. The channel may be between the vehicle floor 42 and the rocker 44. The channel may be sized and shaped to receive at least one of the upper bar 26 and the lower bar 24 when the upper bar 26 and the lower bar 24 are in the lowered positions. In the example shown in FIG. 9, the upper bar 26 and the lower bar 24 are both received by the channel in the rocker 44 when the upper bar 26 and the lower bar 24 are in the lowered positions.

The vehicle 12 may include any suitable number of assemblies 10 supported by the vehicle body 30. For example, the vehicle 12 may include an assembly 10 on each side of the passenger compartment 32. Each of the assemblies 10 on each side of the vehicle 12 may be identical to each other except being supported by opposite sides of the vehicle 12 with each assembly 10 being constructed as described above.

The computer 74 controls the operation of the assembly 10. Specifically, the computer 74 may be a restraints control module. Use of "in response to," "based on," and "upon determining" herein, including with reference to the computer 74 and methods performed by the computer 74, indicates a causal relationship, not merely a temporal relationship.

Figure 10:
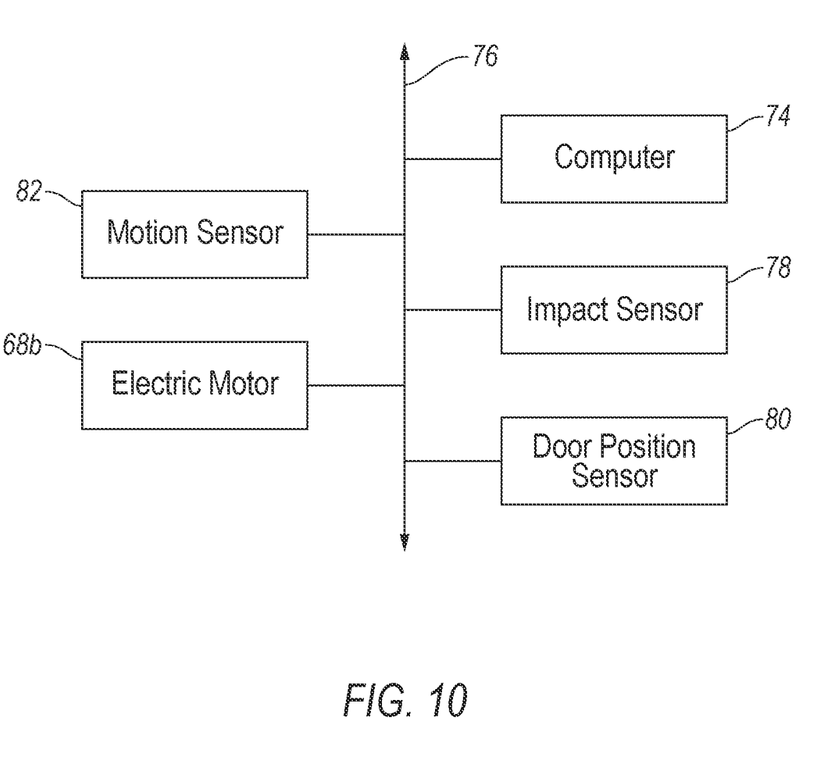
FIG. 10 is a block diagram of a vehicle communication network of the vehicle.

The computer 74 includes a processor and a memory. The memory includes one or more forms of computer readable media, and stores instructions executable by the processor for performing various operations, including as disclosed herein. For example, the computer 74 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 74 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 74. The memory can be of any type, e.g., hard disk drives, solid state drives, servers, or any volatile or non-volatile media. The memory can store the collected data sent from the sensors. The memory can be a separate device from the computer 74, and the computer 74 can retrieve information stored by the memory via a network in the vehicle 12, e.g., over a CAN bus, a wireless network, etc. Alternatively or additionally, the memory can be part of the computer 74, e.g., as a memory of the computer 74. The computer 74 may include or be communicatively coupled to, e.g., via a vehicle network 76 such as a communications bus as described further below, more than one processor, e.g., included in components such as sensors, electronic control units (ECUs) or the like included in the vehicle 12 for monitoring and/or controlling various vehicle 12 components. As shown in FIG. 10, the computer 74 is generally arranged for communications on a vehicle communication network 76 that can include a bus in the vehicle 12 such as a controller area network CAN or the like, and/or other wired and/or wireless mechanisms. Alternatively or additionally, in cases where the computer 74 actually comprises a plurality of devices, the vehicle communication network 76 may be used for communications between devices represented as the computer 74 in this disclosure. Further, as mentioned below, various controllers and/or sensors may provide data to the computer 74 via the vehicle communication network 76.

The vehicle 12 may include at least one impact sensor 78 for sensing impact of the vehicle 12, and the computer 74 in communication with the impact sensor 78. Alternatively or additionally to sensing impact, the impact sensor 78 may be configured to sense impact prior to impact, i.e., pre-impact sensing. The impact sensor 78 is configured to detect an impact to the vehicle 12. The impact sensor 78 may be of any suitable type, for example, post contact sensors such as accelerometers, pressure sensors, and contact switches; and pre impact sensors such as radar, LIDAR, and vision sensing systems. The vision sensing systems may include one or more cameras, CCD image sensors, CMOS image sensors, etc. The impact sensor 78 may be located at numerous points in or on the vehicle 12.

The vehicle 12 may include door position sensors 80 to determine the position of the doors 48, i.e., door position sensors 80 may indicate whether the doors 48 are in the open position or the closed position. The door position sensors 80 may be in communication with the computer 74. The door position sensors 80 may send a signal to the computer 74 to indicate whether the doors 48 are in the open position or the closed position. The vehicle 12 may include any suitable number of door position sensors 80 to determine the position of multiple doors 48 in the vehicle 12. In other words, the vehicle 12 may include a number of door position sensors 80 equal to the number of doors 48 in the vehicle 12.

The vehicle 12 may include a plurality of vehicle modes. The vehicle 12 may include, for example, the vehicle modes of Park, Drive, Neutral, and Reverse. In vehicles 12 with a transmission, the driver may physically change the vehicle mode by shifting the transmission. In other vehicles 12, e.g., electric vehicles, the vehicle mode may be changed electronically. As one example, the driver may change the vehicle mode by pressing a button in the vehicle 12 corresponding to the vehicle mode. As another example, the vehicle 12 may be autonomous and may change the vehicle mode without input by the driver. The terms "Park," "Drive," "Neutral," and "Reverse," are to be construed by their plain and ordinary meaning as understood by an average driver of a vehicle 12 with an internal combustion engine. In other words, Park means the vehicle 12 is stationary without application of the brakes, Drive means the vehicle 12 is capable of powered movement in a vehicle-forward direction when the brakes are released, Neutral means the vehicle 12 will move in either the vehicle-forward direction or the vehicle-rearward direction when the brakes are released, and Reverse means the vehicle 12 is capable of powered movement in a vehicle-rearward when the brakes are released.

The upper bar 26 may move to the raised position and the lowered position based on motion of the vehicle 12. The upper bar 26 may move to the raised position in the event of powered movement of the vehicle 12 in either a vehicle-forward direction, e.g., Drive, or a vehicle-rearward direction, e.g., Reverse. The upper bar 26 may move to the lowered position in the event of ceasing powered movement of the vehicle 12 in the vehicle-forward direction or vehicle-rearward direction. As an example, the vehicle 12 may include a transmission (not shown) that may be shifted between gears for driving the vehicle 12 to indicate the direction of motion of the vehicle 12. The transmission may be shifted to Park, Reverse, Neutral, or Drive by a driver of the vehicle 12. The transmission may be shifted to gears other than those gears previously listed depending on the type of vehicle 12 and the engine of the vehicle 12. In other examples, the vehicle 12 may include motors (not shown) that indicate the powered movement of the vehicle 12 in the vehicle-forward direction or the vehicle-rearward direction. The vehicle 12 may include motion sensors 82 that identify whether the vehicle 12 is moving in the vehicle-forward direction or in the vehicle-rearward direction, e.g., Drive versus Reverse, or whether the vehicle 12 is no longer in motion, e.g., Park. The motion sensors 82 may be in communication with the computer 74 to indicate whether the vehicle 12 may be in motion.

Figure 11:
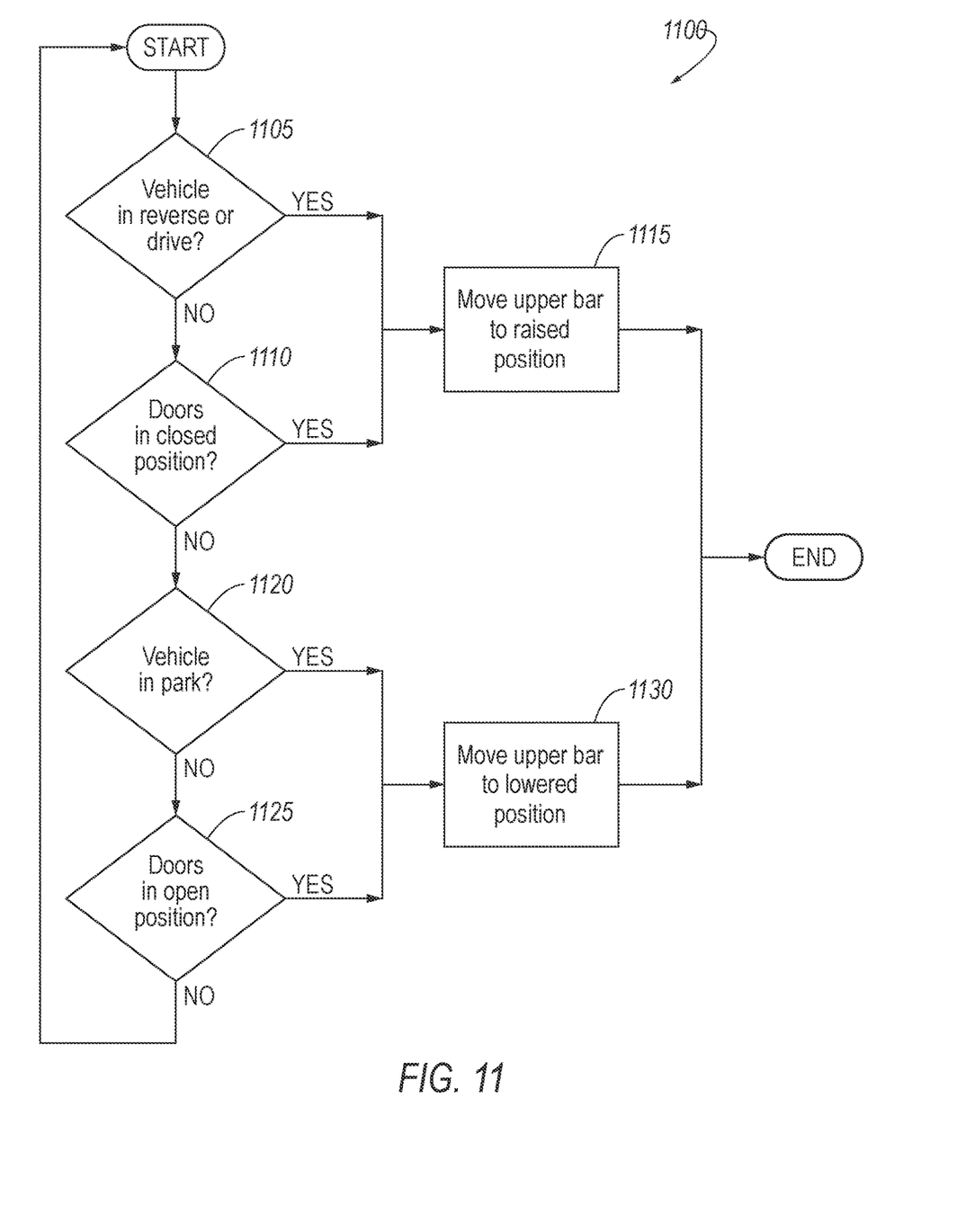
FIG. 11 is a flow chart of a method for moving the assembly from the lowered position to the raised position.

With reference to FIG. 11, the computer 74 stores instructions to control components of the vehicle 12 according to the method shown in FIG. 11. Specifically, as shown in FIG. 11, the method includes instructions for moving the upper bar 26 from the lowered position to the raised position and from the raised position to the lowered position based on other conditions.

With reference to decision block 1105, the method includes identifying the vehicle mode of the vehicle 12. Specifically, the method includes identifying whether the vehicle mode is Drive, Reverse, or Park. In other words, the method includes identifying whether the vehicle 12 may be in motion in the vehicle-forward direction or in the vehicle-rearward direction. The motion sensors 82 may instruct the computer 74 of the direction of the motion of the vehicle 12. If the vehicle 12 is not identified as being in Drive or Reverse, the method moves to decision block 1110.

With reference to decision block 1110, if the vehicle mode is not identified as being in Drive or Reverse, the method includes to identify the position of the doors 48 supported by the front pillar 14 and the rear pillar 16 of the vehicle 12 as being in the closed position. The door position sensors 80 may instruct the computer 74 of the position of the doors 48. If the doors 48 are not identified as being in the closed position, the method moves to decision block 1120.

With reference to block 1115, based on identifying the vehicle mode is Drive or Reverse or upon identifying the position of the doors 48 as being in the closed position, the method includes to move the upper bar 26 elongated from the front pillar 14 to the rear pillar 16 from the lowered position to the raised position. The computer 74 may instruct the electric motors 68*b* to rotate the lead screw 68*a* to move the upper bar 26 to the raised positions.

With reference to decision block 1120, if the doors are not identified as being in the closed position, the method includes identifying whether the vehicle mode is Park. In other words, the method includes identifying whether the vehicle 12 may be stationary or allowing passengers to enter or exit the passenger compartment 32. The motion sensors 82 may instruct the computer 74 that the vehicle 12 is in Park. If the vehicle 12 is not identified as being in Park, the method moves to decision block 1125.

With reference to decision block 1125, if the vehicle 12 is not identified as being in Park, the method includes to identify the position of the doors 48 as being in the open position. The door position sensors 80 may send a signal to the computer 74 indicating the position of the doors 48. If the doors 48 are not identified as being in the open position, the method returns to its start.

With reference to block 1130, based on identifying the vehicle mode has been shifted to Park or upon identifying the doors 48 are in the open position, the method includes to move the upper bar 26 and the lower bar 24 from the raised position to the lowered position to allow passengers to enter or exit the vehicle 12. The computer 74 may instruct the electric motors 68*b* to rotate the lead screw 68*a* to move the bars 24, 26 to the raised position.

The disclosure has been described in an illustrative manner, and it is to be understood that the terminology which has been used is intended to be in the nature of words of description rather than of limitation. Use of based on herein indicates a causal relationship, not merely a temporal relationship. Many modifications and variations of the present disclosure are possible in light of the above teachings, and the disclosure may be practiced otherwise than as specifically described.

The invention claimed is:

1. An assembly comprising:
a front pillar and a rear pillar spaced along a vehicle-longitudinal axis, the front pillar and the rear pillar defining a door opening;
a first track supported by the front pillar and a second track supported by the rear pillar;
a lower bar and an upper bar movable upwardly relative to the lower bar along the first track and the second track from a lowered position to a raised position; and
a crossmember pivotally coupled to the lower bar and the upper bar.

2. The assembly as set forth in claim 1, further comprising a second crossmember pivotally coupled to the lower bar and the upper bar, the second crossmember being elongated transverse to the crossmember when the upper bar is in the raised position.

3. The assembly as set forth in claim 2, wherein the crossmember and the second crossmember are pivotally engaged with each other.

4. The assembly as set forth in claim 2, further comprising a slot in the crossmember, a slot in the second crossmember, and a pin slideably engaged with the slot of the crossmember and the slot of the second crossmember.

5. The assembly as set forth in claim 2, wherein at least one of the upper bar and the lower bar includes two slots, the crossmember being slideably engaged with one of the slots and the second crossmember being slideably engaged with the other of the slots.

6. The assembly as set forth in claim 2, wherein at least one of the upper bar and the lower bar includes a channel and a glide, the glide being supported in the channel.

7. The assembly as set forth in claim 6, wherein the glide is connected to the crossmember.

8. The assembly as set forth in claim 7, wherein the channel includes a second glide, the second glide being connected to the second crossmember.

9. The assembly as set forth in claim 1, wherein the upper bar and the lower bar are spaced from each other in the raised position.

10. The assembly as set forth in claim 1, further comprising a door between the front pillar and the rear pillar, the door having a closed position, the upper bar in the raised position when the door is in the closed position.

11. The assembly as set forth in claim 10, wherein the door is supported on the front pillar or the rear pillar.

12. The assembly as set forth in claim 10, further comprising a roof rail, the door being supported on the roof rail.

13. The assembly as set forth in claim 1, further comprising a rocker elongated from the front pillar to the rear pillar, the lower bar being supported by the rocker.

14. The assembly as set forth in claim 13, wherein the lower bar and the upper bar are vehicle-inboard of the rocker.

15. The assembly as set forth in claim 1, wherein the upper bar and the lower bar are vehicle-inboard of the door opening.

16. The assembly of claim 1, further comprising a computer including a processor and a memory storing instructions executable by the processor to:

identify a position of a door supported by a vehicle frame as being in a closed position;

identify a vehicle mode of drive; and move the upper bar to a raised position based on at least the identification of the door being in the closed position or the identification of the vehicle mode being drive.

17. The assembly of claim 16, wherein the instructions include to:

identify a vehicle mode of park; and identify the vehicle mode has been switched to park and move the upper bar from the raised position to the lowered position based on at least one of identification of the door being in the open position or identification of the vehicle mode being switched to park.

18. The assembly of claim 1, further comprising a linear actuator operatively connected to the upper bar to move the upper bar along the first track between the raised position and the lowered position.

19. The assembly of claim 18, wherein the linear actuator includes a lead screw threadedly engaged with the upper bar and a motor operatively engaged with the lead screw to rotate the lead screw.

* * * * *